United States Patent
Nakano

(10) Patent No.: US 6,979,113 B2
(45) Date of Patent: Dec. 27, 2005

(54) SURFACE LIGHT SOURCE DEVICE

(75) Inventor: Hiroyuki Nakano, Nishgoshi-machi (JP)

(73) Assignee: Advanced Display Inc., Kumamoto (JP)

(*) Notice: Subject to any disclaimer, the term of this patent is extended or adjusted under 35 U.S.C. 154(b) by 197 days.

(21) Appl. No.: 10/740,627

(22) Filed: Dec. 22, 2003

(65) Prior Publication Data
US 2004/0130885 A1    Jul. 8, 2004

(30) Foreign Application Priority Data
Dec. 27, 2002 (JP) ............................ P2002-381390

(51) Int. Cl.[7] ................... G02F 1/1335; G02F 1/1333; F21V 7/04
(52) U.S. Cl. .................. 362/633; 362/632; 362/634; 362/611; 349/58; 349/61; 349/65
(58) Field of Search ................... 362/632, 633, 362/634, 600–631; 349/58, 61, 65

(56) References Cited

U.S. PATENT DOCUMENTS 5,666,172 A * 9/1997 Ida et al. .................... 349/58
6,634,761 B2 * 10/2003 Ichikawa .................... 362/600
6,867,827 B2 * 3/2005 Cha et al. .................... 349/65

FOREIGN PATENT DOCUMENTS

JP          05-257142         10/1993

* cited by examiner

Primary Examiner—Thomas M. Sember
Assistant Examiner—James W Cranson, Jr.
(74) Attorney, Agent, or Firm—McDermott Will & Emery LLP

(57) ABSTRACT

In an edge-light-type surface light source device, a reflecting means for reflecting light is provided on portions of a first frame that surround each linear light source and other reflecting means are provided on portions of a second frame that are opposed to a reflection surface of a light guide plate and each linear light source, respectively. As a result, lamp reflectors and a reflection sheet of a conventional surface light source device can be omitted. The reflecting members, which are made of a high-reflectance metal such as silver, are formed by common evaporation, a method of applying paste containing fine metal particles, a method of a thin metal plate integrally with each of the first and second frames.

16 Claims, 3 Drawing Sheets

(b)

(a)   (b)

(a)   (b)

Prior art

SURFACE LIGHT SOURCE DEVICE

BACKGROUND OF THE INVENTION

1. Field of the Invention

The present invention relates to a surface light source device used as a backlight of a liquid crystal display device or the like. In particular, the invention relates to an edge-light-type surface light source device in which a linear light source is disposed along one end face of a light guide plate.

2. Description of the Related Art

The configuration of a conventional edge-light-type surface light source device 100 will be described below with reference to FIGS. 5(*a*) and 5(*b*). Each linear light source 1 is held, at both its ends, by a holding member 2 made of a resin or rubber and is disposed along one of two end faces 3*c* and 3*d* of a light guide plate 3 that is made of an acrylic resin or the like. A lamp reflector 4 that is a metal plate or the like surrounds the associated linear light source 1 and is fitted with an end portion of the light guide plate 3. Opposed to the end face 3*c* or 3*d*, the lamp reflector 4 reflects light coming from the linear light source 1 toward the end face 3*c* or 3*d* of the light guide plate 3. An optical sheet 5 including a diffusion sheet and a lens sheet is disposed on the light emission surface 3*a* side of the light guide plate 3, and a reflection sheet 6 is disposed on the reflection surface 3*b* side of the light guide plate 3. All of the above components are held between a picture-frame-like first frame 7 that covers the periphery of the light emission surface 3*a* of the light guide plate 3 and partially surrounds each lamp reflector 4 and a second frame 8 that is disposed on the reflection surface 3*b* side of the light guide plate 3.

JP-A-5-257142 (page 12 and FIG. 36) discloses a surface light source device (i.e., a backlight of a liquid crystal display device) having a structure that a bottom case of the backlight and a reflection plate are an integral member formed by molding a white rigid resin capable of reflecting light efficiently.

Requiring the individual components such as the first frame 7, the second frame 8, and the lamp reflectors 4 and the reflection sheet 6 for reflecting light beams coming from the linear light sources 1 toward the end faces of the light guide plate 3, the conventional surface light source device of FIG. 5 has a number of components and is complex in structure. As such, the conventional surface light source device of FIG. 5 has problems that it requires complicated assembling work and the manufacturing cost is high.

To solve the above problems, the backlight disclosed in JP-A-5-257142 is a back-surface-direct-incidence-type backlight in which light beams coming from a plurality of linear light sources are reflected so as to reach a liquid crystal display portion directly. This backlight is hence different in structure from the edge-light-type backlight of FIG. 5 having such components as the light guide plate 3 and the lamp reflectors 4.

SUMMARY OF THE INVENTION

The present invention has been made to solve the above problems, and an object of the invention is therefore to provide an edge-light-type surface light source device in which the number components is small, the structure is simple, and the manufacturing cost is low.

A surface light source device according to a first aspect of the invention comprises a light guide plate, a linear light source, an optical sheet, a reflection sheet, a first frame, a second frame, and reflecting means. The light guide plate has a light emission surface and a reflection surface that are opposed to each other and end faces that connect the light emission surface and the reflection surface. The linear light source is disposed along one of the end faces of the light guide plate. The optical sheet is disposed on the light emission surface side of the light guide plate. The reflection sheet is disposed on the reflection surface side of the light guide plate. The first frame includes a frame plate portion opposed to a periphery of the light emission surface of the light guide plate, an extension portion extending outward from the frame plate portion and opposed to the linear light source, and a frame flange portion bent from the extension portion and opposed to the linear light source and the one end face of the light guide plate. The second frame is provided on the reflection surface side of the light guide plate and holds the light guide plate, the optical sheet, and the reflection sheet between itself and the first frame. The reflecting means is formed on the extension portion and the frame flange portion of the first frame, for reflecting light coming from the linear light source toward the one end face of the light guide plate.

A surface light source device according to a second aspect of the invention comprises a light guide plate, a linear light source, an optical sheet, a lamp reflector, a first frame, a second frame, and reflecting means. The light guide plate has a light emission surface and a reflection surface that are opposed to each other and end faces that connect the light emission surface and the reflection surface. The linear light source is disposed along one of the end faces of the light guide plate. The an optical sheet is disposed on the light emission surface side of the light guide plate. The lamp reflector is fitted with an end portion of the light guide plate so as to surround the linear light source, for reflecting light coming from the linear light source toward the one end face of the light guide plate. The first frame includes a frame plate portion that is opposed to a periphery of the light emission surface of the light guide plate. The second frame includes a plate portion opposed to the reflection surface of the light guide plate and holds the light guide plate and the optical sheet between itself and the first frame. The reflecting means is formed on the plate portion of the second frame, for reflecting light toward the reflection surface of the light guide plate.

A surface light source device according to a third aspect of the invention comprises a light guide plate, a linear light source, an optical sheet, a first frame, a second frame, first reflecting means, second reflecting means, and third reflecting means. The light guide plate has a light emission surface and a reflection surface that are opposed to each other and end faces that connect the light emission surface and the reflection surface. The linear light source is disposed along one of the end faces of the light guide plate. The optical sheet is disposed on the light emission surface side of the light guide plate. The first frame includes a frame plate portion opposed to a periphery of the light emission surface of the light guide plate, an extension portion extending outward from the frame plate portion and opposed to the linear light source, and a frame flange portion bent from the extension portion and opposed to the linear light source and the one end face of the light guide plate. The second frame includes a plate portion opposed to the reflection surface of the light guide plate and an extension portion extending outward from the plate portion and opposed to the linear light source, and holds the light guide plate and the optical sheet between itself and the first frame. The first reflecting means is formed on the extension portion and the frame flange portion of the first frame, for reflecting light coming from the linear light source toward the one end face of the light guide plate. The second reflecting means is formed on the plate portion of the second frame, for reflecting light toward the reflection surface of the light guide plate. The third reflecting means is formed on the extension portion of the second frame, for reflecting light coming from the linear light source so that the light reaches the one end face of the light guide plate.

A surface light source device according to a fourth aspect of the invention comprises a light guide plate, a linear light source, an optical sheet, first reflecting means, a flame, second reflecting means, and third reflecting means. The light guide plate has a light emission surface and a reflection surface that are opposed to each other and end faces that connect the light emission surface and the reflection surface. The linear light source is disposed along one of the end faces of the light guide plate. The optical sheet is disposed on the light emission surface side of the light guide plate and includes an extension portion that is opposed to the linear light source. The first reflecting means is formed on the extension portion of the optical sheet, for reflecting light coming from the linear light source so that the light reaches the one end face of the light guide plate. The frame includes a plate portion opposed to the reflection surface of the light guide plate, an extension portion opposed to the linear light source, and a frame flange portion bent from the extension portion and opposed to the linear light source and the one end face of the light guide, and holds the light guide plate and the linear light source. The second reflecting means formed on the plate portion of the frame, for reflecting light toward the reflection surface of the light guide plate. The third reflecting means is formed on the extension portion and the frame flange portion of the frame, for reflecting light coming from the linear light source toward the one end face of the light guide plate.

DESCRIPTION OF THE PREFERRED EMBODIMENTS

Embodiments of the present invention will be hereinafter described with reference to the drawings.

Embodiment 1

Figure 1:
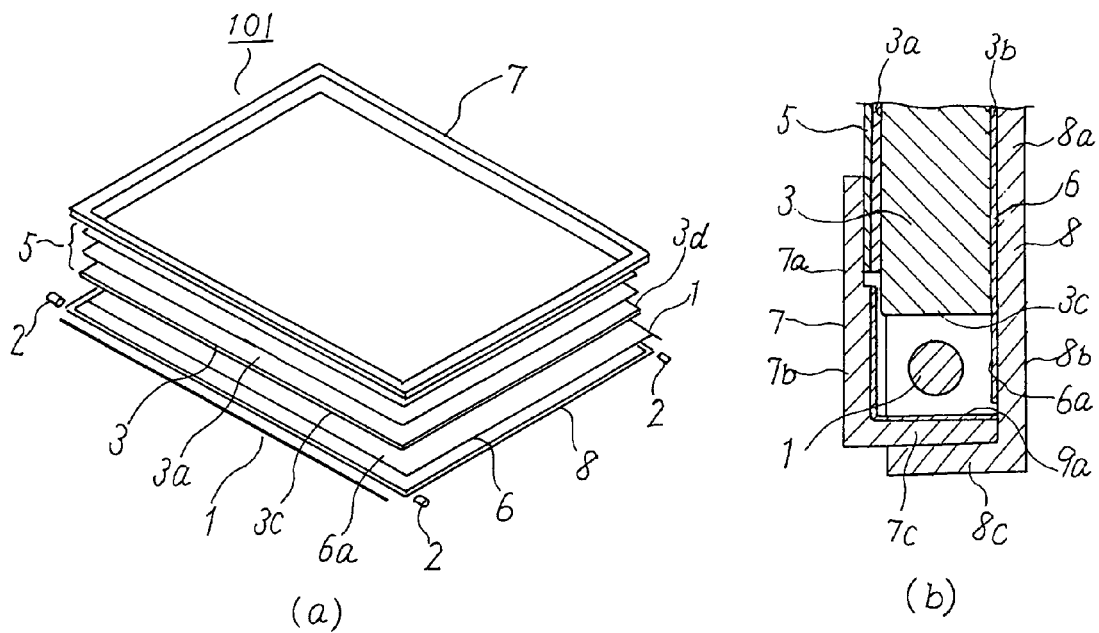
FIGS. 1(a) and 1(b) are an exploded perspective view and a sectional view of the main part of an edge-light-type surface light source device according to a first embodiment of the present invention.

FIG. 1(a) is an exploded perspective view of an edge-light-type surface light source device according to a first embodiment of the invention. FIG. 1(b) is a sectional view of its main part. In the surface light source device 101 according to this embodiment, both ends of each linear light source 1 such as a cold-cathode fluorescent tube are held by a holding member 2 made of a resin or rubber. A rectangular light guide plate 3 made of an acrylic resin or the like has a light emission surface 3a and a reflection surface 3b that are opposed to each other and four end faces that connect the surfaces 3a and 3b. In this embodiment, as shown in FIG. 1(a), two linear light sources 1 are disposed along the two long end faces 3c and 3d, respectively, that are opposed to each other. That is, the end faces 3c and 3d are light incidence faces of the light guide plate 3. Optical sheets 5 including a diffusion sheet and a lens sheet are disposed on the light emission surface 3a side of the light guide plate 3. A reflection sheet 6 is disposed on the reflection surface 3b side of the light guide plate 3, whereby light beams that have entered the light guide plate 3 through the end faces 3c and 3d are reflected efficiently toward the light emission surface 3a. The reflection sheet 6 has extension portions 6a that are opposed to the respective linear light sources 1. The extension portions 6a of the reflection sheet 6 reflect light beams coming from the linear light sources 1, respectively, so that the light beams reach the respective end faces 3c and 3d.

The linear light sources 1, the holding members 2, the light guide plate 3, the optical sheets 5, and the reflection sheet 6 are held between a picture-frame-like first frame 7 that surrounds the periphery of the light emission surface 3a of the light guide plate 3 and a second frame 8 that is disposed on the reflection surface 3b side of the light guide plate 3.

As shown in FIG. 1(b), the first frame 7 has a frame plate portion 7a that is parallel with the light emission surface 3a of the light guide 3 and is opposed to the periphery of the light emission surface 3a, and extension portions 7b that extend outward from the frame plate portion 7a and are opposed to the respective linear light sources 1, and frame flange portions 7c that are bent at a right angle from the respective extension portions 7b and are opposed to the respective linear light sources 1 and the respective end faces 3c and 3d of the light guide plate 3. The second frame 8 has a plate portion 8a that is opposed to the entire reflection surface 3b of the light guide plate 3, extension portions 8b extend outward from the plate portion 8a and are opposed to the respective linear light sources 1, and frame flange portions 8c that are bent at a right angle from the respective extension portions 8b and are opposed to the respective linear light sources 1 and the respective end faces 3c and 3d of the light guide plate 3. The frame flange portion 8c of the second frame 8 is fitted on the periphery of the frame flange portion 7c of the first frame 7.

For example, a liquid crystal display panel (not shown) that displays an image utilizing the birefringence of a liquid crystal is placed on the light emission surface 3a of the light guide plate 3 of the above-configured surface light source device 101, to complete a liquid crystal display device.

Figure 5:
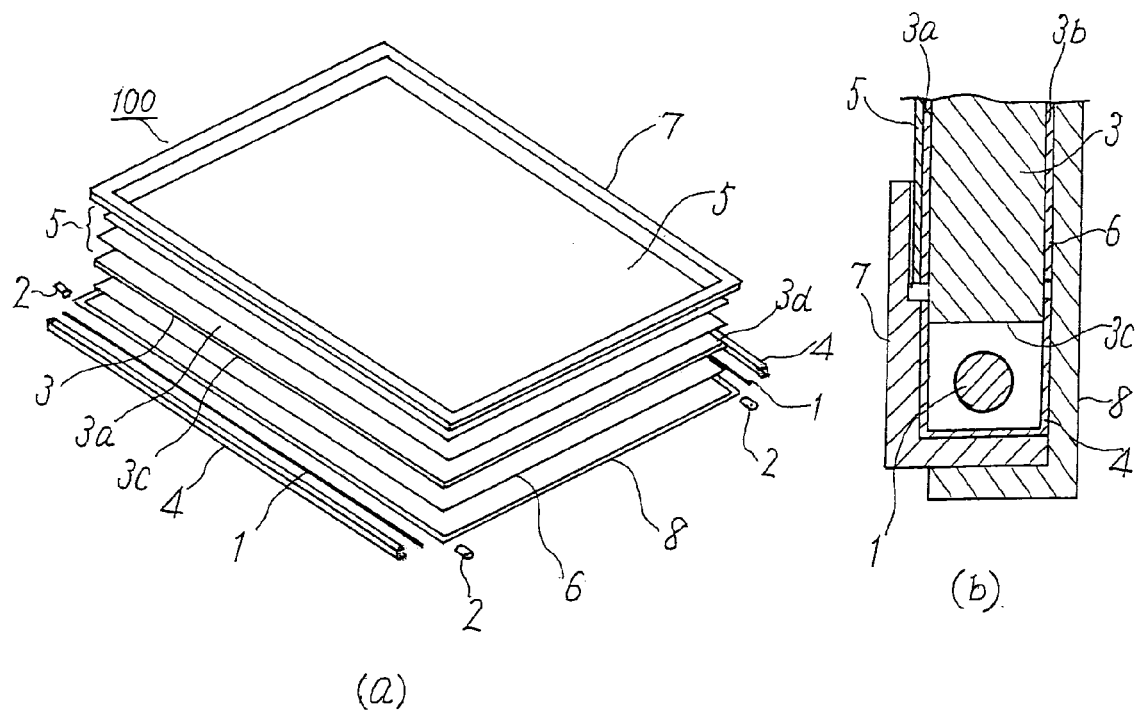
FIGS. 5(a) and 5(b) are an exploded perspective view and a sectional view of the main part of a conventional edge-light-type surface light source device.

In this embodiment, the reflection sheet 6 has the extension portions 6a that are opposed to the respective linear light sources 1. Further, a reflecting means 9a for reflecting light is provided on the portions of the first frame 7 that surround each linear light source 1, that is, the inner surfaces of the extension portion 7 band the frame flange portion 7c. As a result, the lamp reflectors 4 of the conventional surface light source device 100 (see FIG. 5) is made unnecessary. Light coming from each linear light source 1 is reflected by the extension portion 6a of the reflection sheet 6 and the reflecting means 9a and thereby guided to the end face 3c or 3d of the light guide plate 3. The reflecting means 9a, which is made of a high-reflectance metal such as silver, is formed by common evaporation, a method of applying paste containing fine metal particles, a method of molding a thin metal plate integrally with each of the extension portion 7b and the flame flange portion 7c of the first frame 7, or a like method. Making the reflecting means 9a conductive and grounding it electrically provides another advantage of suppressing horizontal streaks that may appear on the screen of the liquid crystal display panel if no proper measure is taken. A high-quality liquid crystal display device can be obtained that is free of display failures.

As described above, according to this embodiment, in the edge-light-type surface light source device 101, the reflecting means 9a for reflecting light is provided on the portions of the first frame 7 that surround each linear light source 1. As a result, the lamp reflectors 4 of the conventional surface light source device 100 can be removed. Therefore, the number of components can be reduced, the structure can be simplified, and the manufacturing cost can be reduced.

Embodiment 2

Figure 2:
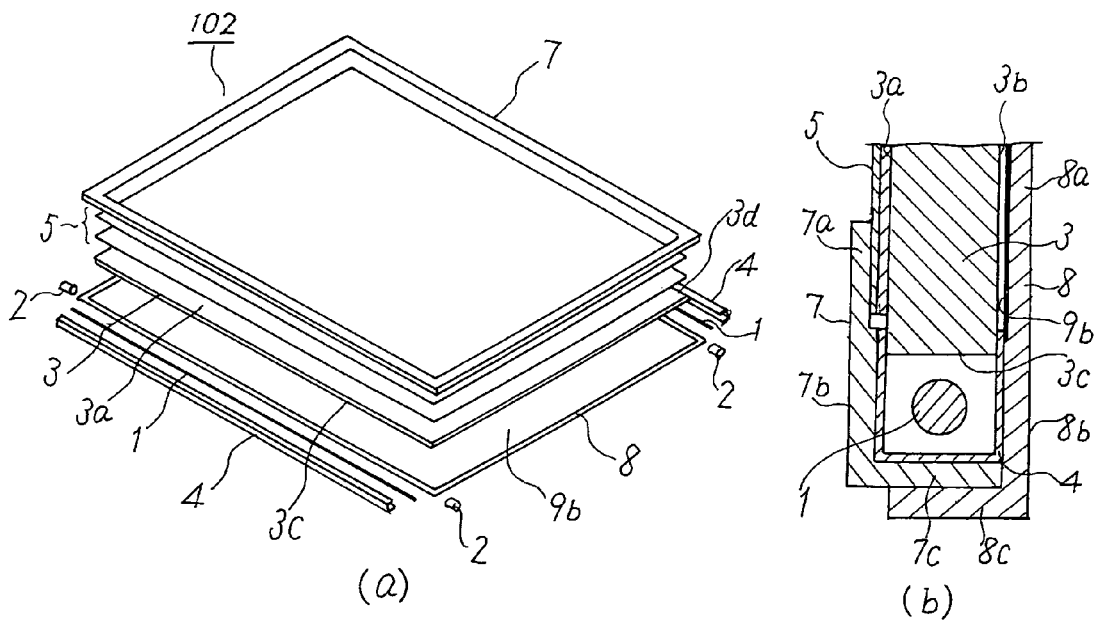
FIGS. 2(a) and 2(b) are an exploded perspective view and a sectional view of the main part of an edge-light-type surface light source device according to a second embodiment of the invention.

FIG. 2(a) is an exploded perspective view of an edge-light-type surface light source device according to a second embodiment of the invention. FIG. 2(b) is a sectional view of its main part. Components in FIGS. 2(a) and 2(b) having the same or corresponding components in FIGS. 1(a) and 1(b) are given the same reference symbols as the latter and will not be described. The edge-light-type surface light source device 102 according to this embodiment is equipped with the lamp reflectors 4 that are fitted with the respective end portions of the light guide plate 3 so as to surround the respective linear light sources 1 and to be opposed to the respective end faces 3c and 3d. The lamp reflectors 4 reflect light beams coming from the linear light sources 1 toward the end faces 3c and 3d, respectively. Further, a reflecting means 9b that reflects light toward the reflection surface 3b of the light guide plate 3 is provided on the plate portion 8a of the second frame 8, whereby no reflection sheet 6 needs to be provided on the reflection surface 3b side of the light guide plate 3. Therefore, no reflection sheet 6 is provided. The other part of the configuration is the same as in the first embodiment and hence will not be described.

In this embodiment, the reflecting means 9b for reflecting light is provided on the portion of the second frame 8 that is opposed to the reflection surface 3b of the light guide plate 3, that is, of the inner surface of the plate portion 8a (indicated by a thick line in FIG. 2B). As a result, the reflection sheet 6 of the conventional surface light source device 100 (see FIG. 5) is made unnecessary. The reflecting means 9b, which is made of a high-reflectance metal such as silver, is formed by common evaporation, a method of applying paste containing fine metal particles, a method of molding a thin metal plate integrally with the plate portion 8a of the second frame 8, or a like method. Making the reflecting means 9b conductive and grounding it electrically provides another advantage of suppressing horizontal streaks that may appear on the screen of the liquid crystal display panel if no proper measure is taken. A high-quality liquid crystal display device can be obtained that is free of display failures.

As described above, according to this embodiment, in the edge-light-type surface light source device 102, the reflecting means 9b for reflecting light is provided on the plate portion 8a of the second frame 8 that is opposed to the reflection surface 3b of the light guide plate 3. As a result, the reflection sheet 6 of the conventional surface light source device 100 can be removed. Therefore, the number of components can be reduced, the structure can be simplified, and the manufacturing cost can be reduced.

Embodiment 3

Figure 3:
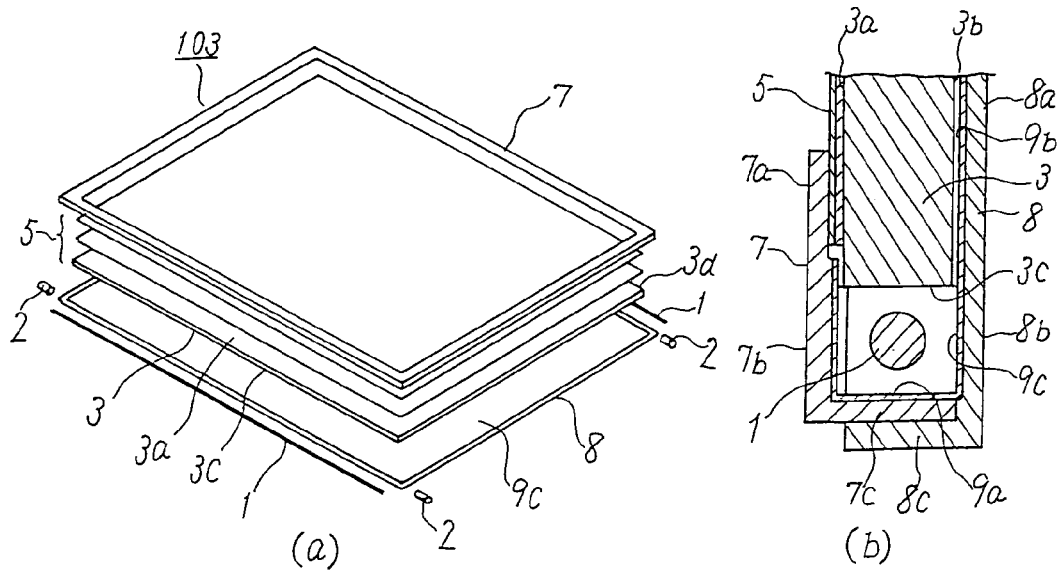
FIGS. 3(a) and 3(b) are an exploded perspective view and a sectional view of the main part of an edge-light-type surface light source device according to a third embodiment of the invention.

FIG. 3(a) is an exploded perspective view of an edge-light-type surface light source device according to a third embodiment of the invention. FIG. 3(b) is a sectional view of its main part. Components in FIGS. 3(a) and 3(b) having the same or corresponding components in FIGS. 1(a) and 1(b) and FIGS. 2(a) and 2(b) are given the same reference symbols as the latter and will not be described. In the surface light source device 103 according to this embodiment, no reflection sheet 6 is disposed on the reflection surface 3b side of the light guide plate 3.

This embodiment is the same as the first embodiment in that the reflecting means 9a for reflecting light is provided on the portions of the first frame 7 that surround each linear light source 1, that is, the inner surfaces of the extension portion 7b and the frame flange portion 7c of the first frame 7. Further, reflecting means 9b and 9c are provided on the plate portion 8a and each extension portion 8b of the second frame 8. The reflecting means 9c provided on the second frame 8 may be either integral with or separate from reflecting means 9b that is provided on the inner surface of the plate portion 8a. As a result, the lamp reflectors 4 and the reflection sheet 6 of the conventional surface light source device 100 (see FIG. 5) are made unnecessary. The reflecting means 9a, 9b, and 9c, which are made of a high-reflectance metal such as silver, are formed by common evaporation, a method of applying paste containing fine metal particles, a method of molding a thin metal plate integrally with each of the extension portion 7b and the frame flange portion 7c of the first frame 7 and the plate portion 8a and the extension portion 8b of the second frame 8, or a like method. Making the reflecting means 9a, 9b, and 9c conductive and grounding those electrically provides another advantage of suppressing horizontal streaks that may appear on the screen of the liquid crystal display panel if no proper measure is taken. A high-quality liquid crystal display device can be obtained that is free of display failures.

As described above, according to this embodiment, in the edge-light-type surface light source device 103, the reflecting means 9a for reflecting light are provided on the extension portions 7b and the frame flange portions 7c of the first frame 7 and the reflecting means 9b and 9c are provided on the plate portion 8a and the extension portions 8b, respectively, of the second frame 8. As a result, the lamp reflectors 4 and the reflection sheet 6 of the conventional surface light source device 100 can be removed. Therefore, the number of components can be reduced, the structure can be simplified, and the manufacturing cost can be reduced.

Embodiment 4

Figure 4:
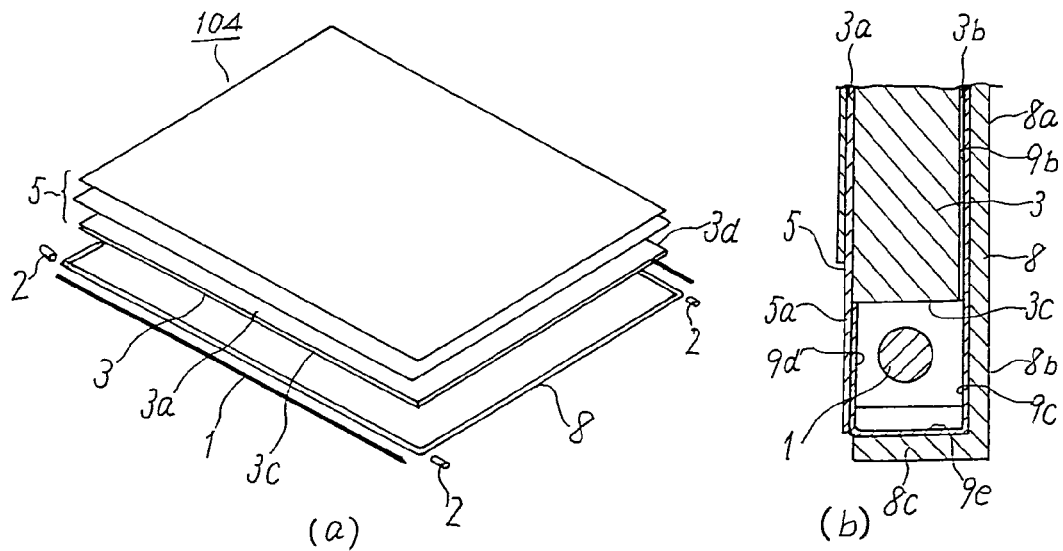
FIGS. 4(a) and 4(b) are an exploded perspective view and a sectional view of the main part of an edge-light-type surface light source device according to a fourth embodiment of the invention.

FIG. 4(a) is an exploded perspective view of an edge-light-type surface light source device according to a fourth embodiment of the invention. FIG. 4(b) is a sectional view of its main part. Components in FIGS. 4(a) and 4(b) having the same or corresponding components in FIGS. 1(a) and 1(b), FIGS. 2(a) and 2(b), and FIGS. 3(a) and 3(b) are given the same reference symbols as the latter and will not be described. In the surface light source device 104 according to this embodiment, one of the optical sheets 5 that is disposed on the light emission surface 3a side of the light guide plate 3 has extension portions 5a that are opposed to the respective linear light sources 1. Further, the first frame 7 is omitted and the second frame 8 holds all the components.

In this embodiment, the one of the optical sheets 5 has the extension portions 5a that is opposed to the respective linear light sources 1 and a reflecting means 9d for reflecting light is formed on the inner surface of each extension portion 5a. Further, the reflecting means 9b and 9c are provided on the inner surfaces of the plate portion 8a and each extension portion 8b, respectively, of the frame 8. Still further, a reflecting means 9e is provided on the inner surface of each frame flange portion 8c that is opposed to the associated linear light source 1 and the end face 3c or 3d of the light guide plate 3. The reflecting means 9e may be either integral with or separate from the reflecting means 9b and 9c. As a result, the lamp reflectors 4, the reflection sheet 6, and the first frame 7 of the conventional surface light source device 100 (see FIG. 5) are made unnecessary. However, it is necessary to separately provide, instead of the first frame 7, a fixing means (not shown) for fixing the optical sheets 5. The reflecting means 9d, 9b, 9c and 9e, which are made of a high-reflectance metal such as silver, are formed by common evaporation, a method of applying paste containing fine metal particles, a method of molding a thin metal plate integrally with each of the one of the optical sheets 5 and the plate portion 8a, the extension portion 8b and the frame flange portion 8c of the second frame 8, or a like method. Making the reflecting means 9d and 9e conductive and grounding those electrically provides another advantage of suppressing horizontal streaks that may appear on the screen of the liquid crystal display panel if no proper measure is taken. A high-quality liquid crystal display device can be obtained that is free of display failures.

As described above, according to this embodiment, in the edge-light-type surface light source device 104, the reflecting means 9d for reflecting light is provided on each extension portion 5a of one of the optical sheets 5 that is opposed to the linear light source 1. Further, the reflecting means 9b is formed on the plate portion 8a of the second frame 8 that is opposed to the reflection surface 3b of the light guide plate 3, and the reflecting means 9c and 9e are provided on each extension portion 8b and each frame flange portion 8c of the second frame 8 that are opposed to the associated linear light source 1. As a result, the lamp reflectors 4, the reflection sheet 6, and the first frame 7 of the conventional surface light source device 100 can be removed. Therefore, the number of components can be reduced, the structure can be simplified, and the manufacturing cost can be reduced.

As described above, in the surface light source device according to the first aspect of the invention, the lamp reflectors that are used in the conventional edge-light-type surface light source device can be omitted. Therefore, the number of components can be reduced, the structure can be simplified, and the manufacturing cost can be reduced.

In the surface light source device according to the second aspect of the invention, the reflection sheet that is used in the conventional edge-light-type surface light source device can be omitted. Therefore, the number of components can be reduced, the structure can be simplified, and the manufacturing cost can be reduced.

In the surface light source device according to the third aspect of the invention, the lamp reflectors and the reflection sheet that are used in the conventional edge-light-type surface light source device can be omitted. Therefore, the number of components can be reduced, the structure can be simplified, and the manufacturing cost can be reduced.

In the surface light source device according to the fourth aspect of the invention, the lamp reflectors, the reflection sheet, and the first frame that are used in the conventional edge-light-type surface light source device can be omitted. Therefore, the number of components can be reduced, the structure can be simplified, and the manufacturing cost can be reduced.

What is claimed is:

1. A surface light source device comprising:
    a light guide plate having a light emission surface and a reflection surface that are opposed to each other and end faces that connect the light emission surface and the reflection surface;
    a linear light source disposed along one of the end faces of the light guide plate;
    an optical sheet disposed on the light emission surface side of the light guide plate;
    a reflection sheet disposed on the reflection surface side of the light guide plate;
    a first frame including:
        a frame plate portion opposed to a periphery of the light emission surface of the light guide plate;
        an extension portion extending outward from the frame plate portion and opposed to the linear light source; and
        a frame flange portion bent from the extension portion and opposed to the linear light source and the one end face of the light guide plate;
    a second frame that is provided on the reflection surface side of the light guide plate and holds the light guide plate, the optical sheet, and the reflection sheet between itself and the first frame; and
    reflecting means formed on the extension portion and the frame flange portion of the first frame, for reflecting light coming from the linear light source toward the one end face of the light guide plate.

2. The surface light source device claimed in claim 1, wherein the reflecting means is formed by one method of evaporation and applying paste containing fine metal particles and molding a thin reflecting metal integrally with each of the extension potion and the frame flange portion of the first frame.

3. The surface light source device according to claim 1, wherein the reflecting means is made of a high-reflectance metal.

4. The surface light source device according to claim 3, wherein the reflecting means is electrically conductive.

5. A surface light source device comprising:
    a light guide plate having a light emission surface and a reflection surface that are opposed to each other and end faces that connect the light emission surface and the reflection surface;
    a linear light source disposed along one of the end faces of the light guide plate;
    an optical sheet disposed on the light emission surface side of the light guide plate;
    a lamp reflector fitted with an end portion of the light guide plate so as to surround the linear light source, for reflecting light coming from the linear light source toward the one end face of the light guide plate;
    a first frame including a frame plate portion that is opposed to a periphery of the light emission surface of the light guide plate;
    a second frame that includes a plate portion opposed to the reflection surface of the light guide plate and holds the light guide plate and the optical sheet between itself and the first frame; and
    reflecting means formed on the plate portion of the second frame, for reflecting light toward the reflection surface of the light guide plate.

6. The surface light source device claimed in claim 5, wherein the reflecting means is formed by one method of evaporation and applying paste containing fine metal particles and molding a thin reflecting metal integrally with the plate potion of the second frame.

7. The surface light source device according to claim 5, wherein the reflecting means is made of a high-reflectance metal.

8. The surface light source device according to claim 7, wherein the reflecting means is electrically conductive.

9. A surface light source device comprising:
   a light guide plate having a light emission surface and a reflection surface that are opposed to each other and end faces that connect the light emission surface and the reflection surface;
   a linear light source disposed along one of the end faces of the light guide plate;
   an optical sheet disposed on the light emission surface side of the light guide plate;
   a first frame including:
      a frame plate portion opposed to a periphery of the light emission surface of the light guide plate;
      an extension portion extending outward from the frame plate portion and opposed to the linear light source; and
      a frame flange portion bent from the extension portion and opposed to the linear light source and the one end face of the light guide plate;
   a second frame that includes a plate portion opposed to the reflection surface of the light guide plate and an extension portion extending outward from the plate portion and opposed to the linear light source, and that holds the light guide plate and the optical sheet between itself and the first frame;
   first reflecting means formed on the extension portion and the frame flange portion of the first frame, for reflecting light coming from the linear light source toward the one end face of the light guide plate;
   second reflecting means formed on the plate portion of the second frame, for reflecting light toward the reflection surface of the light guide plate; and
   third reflecting means formed on the extension portion of the second frame, for reflecting light coming from the linear light source so that the light reaches the one end face of the light guide plate.

10. The surface light source device claimed in claim 9, wherein the first reflecting means is formed by one method of evaporation and applying paste containing fine metal particles and molding a thin reflecting metal integrally with each of the extension portion and the frame flange portion of the first frame, the second reflecting means is formed by one method of evaporation and applying paste containing fine metal particles and molding a thin reflecting metal integrally with the plate portion of the second frame, and the third reflecting means is formed by one method of evaporation and applying paste containing fine metal particles and molding a thin reflecting metal integrally with the extension portion of the second frame.

11. The surface light source device according to claim 9, wherein the first, second and third reflecting means are made of a high-reflectance metal.

12. The surface light source device according to claim 11, wherein the first, second and third reflecting means are electrically conductive.

13. A surface light source device comprising:
   a light guide plate having a light emission surface and a reflection surface that are opposed to each other and end faces that connect the light emission surface and the reflection surface;
   a linear light source disposed along one of the end faces of the light guide plate;
   an optical sheet disposed on the light emission surface side of the light guide plate and comprising an extension portion that is opposed to the linear light source;
   first reflecting means formed on the extension portion of the optical sheet, for reflecting light coming from the linear light source so that the light reaches the one end face of the light guide plate;
   a frame that includes a plate portion opposed to the reflection surface of the light guide plate, an extension portion opposed to the linear light source, and a frame flange portion bent from the extension portion and opposed to the linear light source and the one end face of the light guide, and that holds the light guide plate and the linear light source;
   second reflecting means formed on the plate portion of the frame, for reflecting light toward the reflection surface of the light guide plate; and
   third reflecting means formed on the extension portion and the frame flange portion of the frame, for reflecting light coming from the linear light source toward the one end face of the light guide plate.

14. The surface light source device claimed in claim 13, wherein the first reflecting means is formed by one method of evaporation and applying paste containing fine metal particles and molding a thin reflecting metal integrally with the optical sheet, the second reflecting means is formed by one method of evaporation and applying paste containing fine metal particles and molding a thin reflecting metal integrally with the plate portion of the frame, and the third reflecting means is formed by one method of evaporation and applying paste containing fine metal particles and molding a thin reflecting metal integrally with each of the extension portion and the frame flange portion of the frame.

15. The surface light source device according to claim 13, wherein the first, second and third reflecting means are made of a high-reflectance metal.

16. The surface light source device according to claim 15, wherein the first, second and third reflecting means are electrically conductive.

* * * * *